(12) United States Patent
Monbaliu et al.

(10) Patent No.: US 11,910,756 B2
(45) Date of Patent: Feb. 27, 2024

(54) AGRICULTURAL SYSTEM

(71) Applicant: CNH Industrial America LLC, New Holland, PA (US)

(72) Inventors: Sven Monbaliu, Zuienkerke (BE); Olivier Helewaut, Ruddervoorde (BE); Lynn Derynck, Moere (BE); Yves Loosfelt, Zulte (BE)

(73) Assignee: CNH Industrial America LLC, New Holland, PA (US)

( * ) Notice: Subject to any disclaimer, the term of this patent is extended or adjusted under 35 U.S.C. 154(b) by 681 days.

(21) Appl. No.: 17/093,435

(22) Filed: Nov. 9, 2020

(65) Prior Publication Data

US 2021/0137017 A1    May 13, 2021

(30) Foreign Application Priority Data

Nov. 8, 2019  (EP) .................................... 19208196

(51) Int. Cl.
 *A01F 15/08* (2006.01)
 *A01F 15/04* (2006.01)
 *A01F 15/07* (2006.01)

(52) U.S. Cl.
 CPC ........ *A01F 15/0825* (2013.01); *A01F 15/042* (2013.01); *A01F 15/0715* (2013.01); *A01F 15/0841* (2013.01); *A01F 2015/0891* (2013.01)

(58) Field of Classification Search
 CPC .............. A01F 15/0825; A01F 15/042; A01F 15/0715; A01F 15/0841; A01F 2015/0891
 See application file for complete search history.

(56) References Cited

U.S. PATENT DOCUMENTS

| | | | | |
|---|---|---|---|---|
| 4,791,865 A | * | 12/1988 | Naaktgeboren | A01F 15/0825 100/188 R |
| 6,546,705 B2 | * | 4/2003 | Scarlett | A01F 15/00 701/50 |
| 2019/0090429 A1 | * | 3/2019 | Gresch | A01F 15/04 |
| 2019/0335670 A1 | * | 11/2019 | Nona | A01F 15/0825 |

OTHER PUBLICATIONS

Extended European Search Report for EP application 19208196.6, dated Apr. 24, 2020 (8 pages).

* cited by examiner

*Primary Examiner* — Sizo B Vilakazi
(74) *Attorney, Agent, or Firm* — Peter K. Zacharias

(57) ABSTRACT

An agricultural system including an agricultural baler and a control unit. The agricultural baler includes a drive system; a bale chamber defined by at least one movable density door; and at least one actuator for moving the at least one density door. The control unit is configured to: receive a routine-trigger-signal; determine an actuator-control-signal for adjusting a speed at which the at least one actuator moves the at least one density door in response to the routine-trigger-signal; and provide the actuator-control-signal to the drive system for driving the at least one actuator.

14 Claims, 6 Drawing Sheets

AGRICULTURAL SYSTEM

FIELD OF THE INVENTION

The present disclosure relates to agricultural machinery, and, more particularly, to agricultural systems that include agricultural balers. Other aspects of the present disclosure relate to a method for controlling door actuators of an agricultural baler and a corresponding computer program.

BACKGROUND OF THE INVENTION

Agricultural harvesting machines, such as balers, are used to consolidate and package crop material to facilitate the storage and handling of the crop material for later use. In the case of hay, a mower-conditioner is typically used to cut and condition the crop material for windrow drying in the sun. In the case of straw, an agricultural combine discharges non-grain crop material from the rear of the combine defining the straw (such as wheat or oat straw) which is to be picked up by the baler. The cut crop material is typically raked and dried, and a baler, such as a large square baler or round baler, straddles the windrows and travels along the windrows to pick up the crop material and form it into bales.

On a large square baler, a pickup unit at the front of the baler gathers the cut and windrowed crop material from the ground. The pickup unit includes a pickup roll, and optionally may include other components such as side shields, stub augers, wind guard, etc.

A packer unit is used to move the crop material from the pickup unit to a duct or pre-compression chamber. The packer unit forms a wad of crop within the pre-compression chamber, which is then transferred to a main bale chamber. (For purposes of discussion, the charge of crop material within the pre-compression chamber will be termed a "wad", and the charge of crop material after being compressed within the main bale chamber will be termed a "flake"). Typically, such a packer unit includes packer tines or forks to move the crop material from the pickup unit into the pre-compression chamber. Instead of a packer unit it is also known to use a rotor cutter unit, which chops the crop material into smaller pieces.

A stuffer unit transfers the wad of crop material in charges from the pre-compression chamber to the main bale chamber. Typically, such a stuffer unit includes stuffer forks which are used to move the wad of crop material from the pre-compression chamber to the main bale chamber, in sequence with the reciprocating action of a plunger within the main bale chamber.

In the main bale chamber, the plunger compresses the wad of crop material into flakes to form a bale and, at the same time, gradually advances the bale toward the outlet of the bale chamber. The plunger reciprocates, back and forth, toward and away from the discharge end of the baler. The plunger may include a number of rollers, which extend laterally outward from the sides of the plunger. The rollers on each side of the plunger are received within a respective plunger slot formed in the sidewalls of the bale chamber, with the plunger slots guiding the plunger during the reciprocating movements.

When enough flakes have been added and the bale reaches a full (or other predetermined) size, a number of knotters are actuated which wrap and tie twine, cord or the like around the bale while it is still in the main bale chamber. The twine is cut and the formed bale is ejected out the back of the baler as a new bale is formed.

Typically, the bale chamber includes a stationary ceiling, floor and a pair of side walls at the upstream end of the bale chamber. The ceiling and side walls terminate adjacent to a number of so-called "density doors", including a top door and two side doors. The density doors may be pivoted about a pivot axis at the upstream end and clamp against the formed bale to hold the bale and provide resistance as a next bale is formed in the bale chamber. The pressure exerted by the density doors on the bale controls the density of the subsequently formed bales. If the density doors are not correctly pressurised, bales of inadequate density and thus quality may be produced. This may be particularly problematic during start-up of the agricultural baler, since the density doors need to be positioned adequately before the baling process can commence.

In view of the above, there is generally a need for an agricultural machinery and a method of controlling the latter that provides the ability to quickly bring the density doors into position.

It is an aim of the present disclosure to solve or at least ameliorate one or more problems of the prior art.

SUMMARY OF THE INVENTION

Aspects and embodiments of the disclosure provide an agricultural baler and a method for controlling a density door actuator assembly as claimed in the appended claims.

According to a first aspect of the present disclosure, there is provided an agricultural system comprising:
    an agricultural baler, comprising:
    a bale chamber partly defined by at least one movable density door; and
    at least one actuator for moving the at least one density door, and
    a control unit configured to:
    receive a routine-trigger-signal;
    determine an actuator-control-signal for adjusting a speed at which the at least one actuator moves the at least one density door in response to the routine-trigger-signal; and
    provide the actuator-control-signal to a drive system for driving the at least one actuator.

In another embodiment, the least one actuator is operable in a first-actuator-speed-mode, in which the at least one actuator moves the at least one density door at a first speed or in a second-actuator-speed-mode, in which the at least one actuator moves the at least one density door at a second speed, wherein the second speed is greater than the first speed. The control unit may be configured to provide the drive system with an actuator-control-signal for operating the at least one actuator in the second-actuator-speed-mode in response to the routine-trigger-signal.

In another embodiment, the routine-trigger-signal is a start-routine-trigger-signal; and the control unit is configured to provide the drive system with an actuator-control-signal for operating the at least one actuator in the second-actuator-speed-mode to close the at least one density door, in response to the routine-trigger-signal.

In another embodiment, the control unit is further configured to receive a start-routine-end-signal, after the start-routine-trigger-signal and provide the drive system with an actuator-control-signal for operating the at least one actuator in the first-actuator-speed-mode in response to the start-routine-end-signal.

In another embodiment, the control unit is further configured to provide the drive system with an actuator-controlsignal for operating the at least one actuator in the first-actuator-speed-mode prior to receipt of the routine-trigger-signal.

In another embodiment, the routine-trigger-signal is an end-routine-trigger-signal and the control unit is configured to provide the drive system with an actuator-control-signal for operating the at least one actuator in the second-actuator-speed-mode to open the at least one density door in response to the routine-trigger-signal.

In another embodiment, the drive system comprises a fluid supply circuit for providing the at least one actuator with varying amounts of fluid flow to adjust the speed at which the at least one actuator moves the at least one density door.

In another embodiment, the control unit is configured to switch the fluid supply circuit to select the first-actuator-speed-mode, in which a first amount of fluid flow is provided to the at least one actuator, or the second-actuator-speed-mode, in which a second amount of fluid flow is provided to the at least one actuator, the second amount of fluid flow being higher than the first amount of fluid flow.

In another embodiment, the fluid supply circuit comprises at least two fluid flow sources, said fluid flow sources being selectively connectable to the at least one actuator.

In another embodiment, the first-actuator-speed-mode is selected, only one of the at least two fluid flow sources is connected to the at least one actuator, and wherein, when the second-actuator-speed-mode is selected, two or more of the fluid flow sources of the fluid supply circuit are connected to the at least one actuator.

In another embodiment, the fluid supply circuit comprises a fluid flow control module for selectively connecting one or more of the at least two fluid sources to the at least one actuator, and wherein the control unit is configured to provide the actuator-control-signal to the at least one fluid flow control module.

In another embodiment, the at least two fluid flow sources are hydraulic pumps, wherein the two or more hydraulic pumps are preferably driven by a common prime mover.

In another embodiment, the control-unit is configured to adjust the speed at which the at least one actuator moves the at least one density door on the basis of bale-chamber-status-data indicative of crop levels within the bale chamber.

In another embodiment, the agricultural baler comprises a plunger for compressing crop within the bale chamber, and the bale-chamber-status-data is indicative of one or both of a load experienced by the plunger during operation and a plunger stroke information associated with a quantity of plunger strokes over a set time period.

In another embodiment, the control-unit is configured to increase the speed at which the at least one actuator moves the at least one density door if the bale-chamber-status-data indicates that the load experienced by the plunger is below a threshold value for a set period of time.

In another embodiment, the set period of time is determined to be an amount of time it takes for the plunger to complete 5 or 10 strokes.

In another embodiment, the agricultural baler comprises a bale length sensor for determining the length of a bale in the bale chamber, and wherein the bale-chamber-status-data is indicative of a bale length.

In another embodiment, the control unit is configured to increase the speed at which the at least one actuator moves the at least one density door if the bale-chamber-status-data indicates that the bale length is less than a threshold-length, optionally for a set period of time.

According to another aspect of the present disclosure, there is provided a computer-implemented method for controlling an agricultural baler, said baler comprising a bale chamber partly defined by at least one movable density door and at least one actuator for moving the at least one density door. The method comprises receiving a routine-trigger-signal;

determining an actuator-control-signal for adjusting a speed at which the at least one actuator (220A, 220B) moves the at least one density door (210A, 210B, 210C) in response to the routine-trigger-signal; and providing the actuator-control-signal to a drive system for driving the at least one actuator (220A, 220B).

According to another aspect of the present disclosure, there is provided a computer program configured to perform the above method or to configure the above control unit.

According to another aspect of the present disclosure, there is provided an agricultural machinery comprising any agricultural baler disclosed herein (e.g. a baler implement), a control unit and an agricultural vehicle for transporting the agricultural baler implement. There may be provided a computer program, which when run on a computer, causes the computer to configure any apparatus, including a control unit, disclosed herein or perform any method disclosed herein. The computer program may be a software implementation, and the computer may be considered as any appropriate hardware, including a digital signal processor, a microcontroller, and an implementation in read only memory (ROM), erasable programmable read only memory (EPROM) or electronically erasable programmable read only memory (EEPROM), as non-limiting examples. The software may be an assembly program.

The computer program may be provided on a computer readable medium, which may be a physical computer readable medium such as a disc or a memory device, or may be embodied as a transient signal. Such a transient signal may be a network download, including an internet download.

The agricultural work vehicle (or tractor) may include one or more control devices, such as but not limited to programmable or non-programmable processors. Similarly, the baler implement may include one or more control devices, such as but not limited to programmable or non-programmable processors. Additionally, or alternatively, the baler implement may be controlled by one or more control devices of the agricultural work vehicle. Similarly, the agricultural work vehicle may be controlled by one or more control devices of the baler implement.

The agricultural work vehicle and/or the baler implement may be remote controlled, e.g. from a farm office. Accordingly, the agricultural work vehicle may include one or more communication interfaces for connection to a remote processor and/or a remote controller. Similarly, the baler implement may include one or more communication interfaces for connection to a remote processor and/or a remote controller.

Within the scope of this application it is expressly intended that the various aspects, embodiments, examples and alternatives set out in the preceding paragraphs, and the claims and/or the following description and drawings, and in particular the individual features thereof, may be taken independently or in any combination. That is, all embodiments and all features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

The above-mentioned and other features and advantages of this disclosure, and the manner of attaining them, will become more apparent and the disclosure will be better understood by reference to the following description of embodiments of the disclosure taken in conjunction with the accompanying drawings, wherein.

Corresponding reference characters indicate corresponding parts throughout the several views. The exemplifications set out herein illustrate embodiments of the disclosure, and such exemplifications are not to be construed as limiting the scope of the disclosure in any manner.

DETAILED DESCRIPTION OF THE INVENTION

Figure 1:
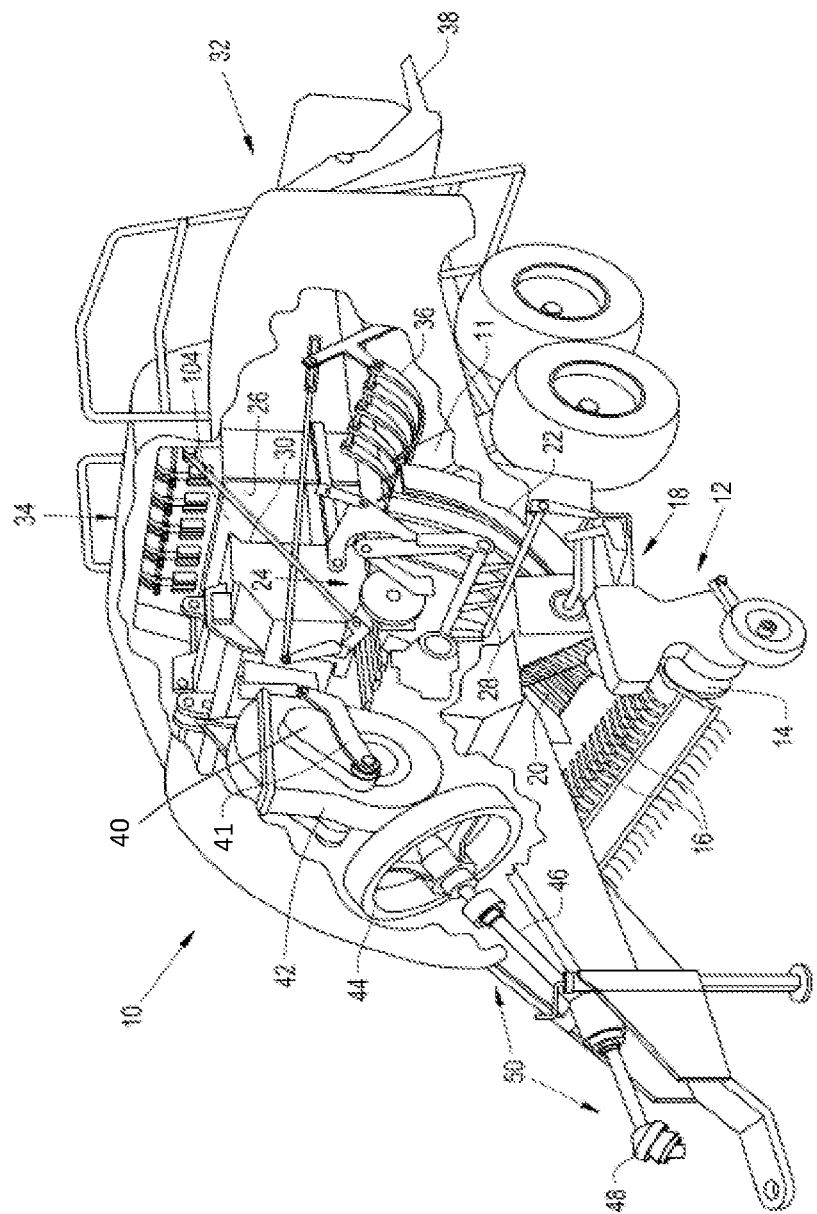
FIG. 1 is a perspective cutaway view showing the internal workings of a large square baler, which includes a bale chamber formed according to the present disclosure.

Referring now to the drawings, and more particularly to FIG. 1, there is shown a perspective cutaway view showing the internal workings of a large square baler 10 including a chassis 11. The baler 10 operates on a two-stage feeding system. Crop material is lifted from windrows into the baler 10 using a pickup unit 12. The pickup unit 12 includes a rotating pickup roll 14 with tines 16 which move the crop rearward toward a packer unit 18 and/or a rotor unit. An optional pair of stub augers (one of which is shown, but not numbered) are positioned above the pickup roll 14 to move the crop material laterally inward. The packer unit 18 includes packer tines 20, which push the crop into a pre-compression chamber 22 to form a wad of crop material. The packer tines 20 intertwine the crop together and pack the crop within the pre-compression chamber 22. The pre-compression chamber 22 and the packer tines 20 function as the first stage for crop compression. Once the pressure in the pre-compression chamber 22 reaches a predetermined sensed value, a stuffer unit 24 moves the wad of crop from the pre-compression chamber 22 to a bale chamber 26, which is carried by the chassis 11 and may also be referred to as a "main bale chamber." The stuffer unit 24 includes stuffer forks 28 which thrust the wad of crop directly in front of a plunger 30, which reciprocates within the main bale chamber 26 and compresses the wad of crop into a flake. The stuffer forks 28 return to their original stationary state after the wad of material has been moved into the main bale chamber 26. The plunger 30 compresses the wads of crop into flakes to form a bale and, at the same time, gradually advances the bale from an inlet end 104 of the main bale chamber 26 toward an outlet 32 of the main bale chamber 26. The main bale chamber 26 and the plunger 30 function as the second stage for crop compression. When enough flakes have been added and the bale reaches a full (or other predetermined) size, knotters 34 are actuated which wrap and tie twine around the bale while it is still in the main bale chamber 26. Needles 36 bring the lower twine up to the knotters 34 and the tying process then takes place. The twine is cut, and the formed bale is ejected from a discharge chute 38 as a new bale is formed.

The plunger 30 is connected via one or two crank arms 40 (only one crank arm is shown in FIG. 1) with a gear box 42. The gear box 42 is driven by a flywheel 44, which in turn is connected via a drive shaft 46 with the power take-off (PTO) coupler 48. The PTO coupler 48 is detachably connected with the PTO spline at the rear of the traction unit, such as a tractor (not shown). The PTO coupler 48, the drive shaft 46 and the flywheel 44 together define a portion of a driveline 50, which provides rotative power to the gearbox 42. The flywheel 44 has a sufficient mass to carry the plunger 30 through a compression stroke as power is applied to the drive shaft 46 by the traction unit (not shown). The number of strokes performed by the plunger per minute is dependent on the PTO speed. In one example, the PTO shaft 13 rotates at a speed of around 1000 rpm such that the plunger 30 completes around 48 strokes per minute.

A conrod 41 connecting the crank arm 40 to the gear box 42 may be equipped with load sensors, particularly load cells that enable determination of a load force experienced by the plunger during the baling process. The load cells may, for example, be provided within the conrod bearings. Alternatively, load sensors may be provided at any other point suitable for detecting the load acting on the plunger during the various phases of the stroke. The load force is typically highest when the plunger 30 engages with the crop in the bale chamber 26.

Figure 2:
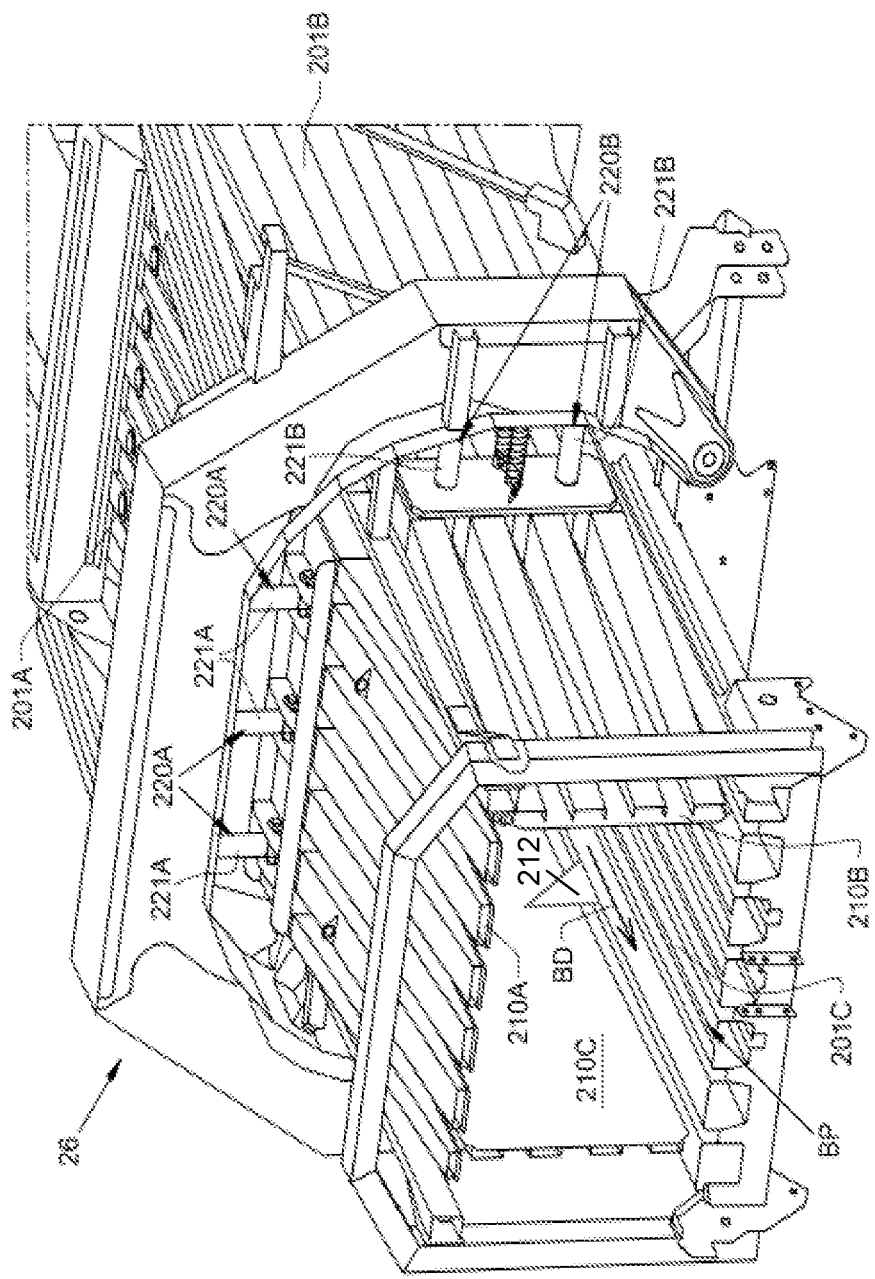
FIG. 2 is a perspective view of the bale chamber formed according to the present disclosure.

Referring now to FIG. 2, a perspective view of the bale chamber 26 is illustrated. The bale chamber 26 generally includes a plurality of stationary walls, which may include a top wall 201A, a pair of opposed side walls 201B, and a stationary bottom wall 201C opposite the top wall 201A. As the bale flows through the bale chamber 26 in a bale forming direction, which is designated by arrow BD, the bale encounters movable density doors 210A, 210B, 210C. In some embodiments, the movable density door 210A is a top density door that is pivotably coupled to a stationary part of the baling chamber 26 so as to form the top wall 201A and the movable density doors 210B and 210C are a pair of side density doors that are each pivotably coupled to a stationary part of the baling chamber 26 so as to form respective side walls 201B. A bale pressing area BP is defined between the density doors 210A, 210B, 210C and the stationary bottom wall 201C where the density doors 210A, 210B, 210C exert a pressure on a bale. The pressure exerted on the bale by the density doors 210A, 210B, 210C holds the bale in place as the plunger 30 compresses the wads of crop into flakes. A greater pressure exerted on the bale by the density doors 210A, 210B, 210C, therefore, results in a more densely packed bale that exits the bale chamber 26.

To adjust the size of the bale pressing area BP, and thus the pressure exerted on the bale by the density doors 210A, 210B, 210C, at least one actuator, e.g. at least one fluid cylinder 220A, 220B, is provided to move the density doors 210A, 210B, 210C. In the illustrated embodiment, the top density door 210A is moved by three fluid cylinders 220A and each of the side density doors 210B, 210C is moved by two fluid cylinders 220B. Each of the fluid cylinders 220A, 220B includes a cylinder rod 221A, 221B that is configured to move one of the density doors 210A, 210B, 210C, as will be described further herein. In some embodiments, the fluid cylinders 220A, 220B are hydraulically powered cylinders supplied with, for example, pressurized oil to extend and retract the cylinder rods 221A, 221B. It should be appreciated that the fluid cylinders 220A, 220B may be powered by fluids other than oil, such as other incompressible fluids, in accordance with the present disclosure.

When the fluid cylinders 220A, 220B are extended, the respective density doors 210A, 210B, 210C are pivoted towards each other to reduce the size of the bale pressing area BP. This movement of the density doors towards each other may also be referred to as "closing" the density doors. When the fluid cylinders 220A, 220B are retracted, the respective density doors 210A, 210B, 210C are pivoted away from each other to increase the size of the bale pressing area BP. This movement of the density doors away from each other may also be referred to as "opening" the density doors.

A bale length sensor may be provided in the bale chamber 26 to continuously or intermittently determine the length of the bale being formed in the bale chamber 26. In the embodiment of FIG. 2, the bale length sensor is a star-wheel 212, extending through the bottom wall 201C of the bale chamber 26. Only a single sprocket of the star-wheel 212 is shown in the bale chamber 26 of FIG. 2. As the bale is pushed through the bale chamber 26, the bale engages the sprockets of the star-wheel 212 and thus moves the sprockets of the star-wheel 212 in the baling direction BD. Movement of the sprockets causes a rotation of the star-wheel that is directly proportional to an extension (e.g. the length) of the bale within the baling chamber.

Figure 3:
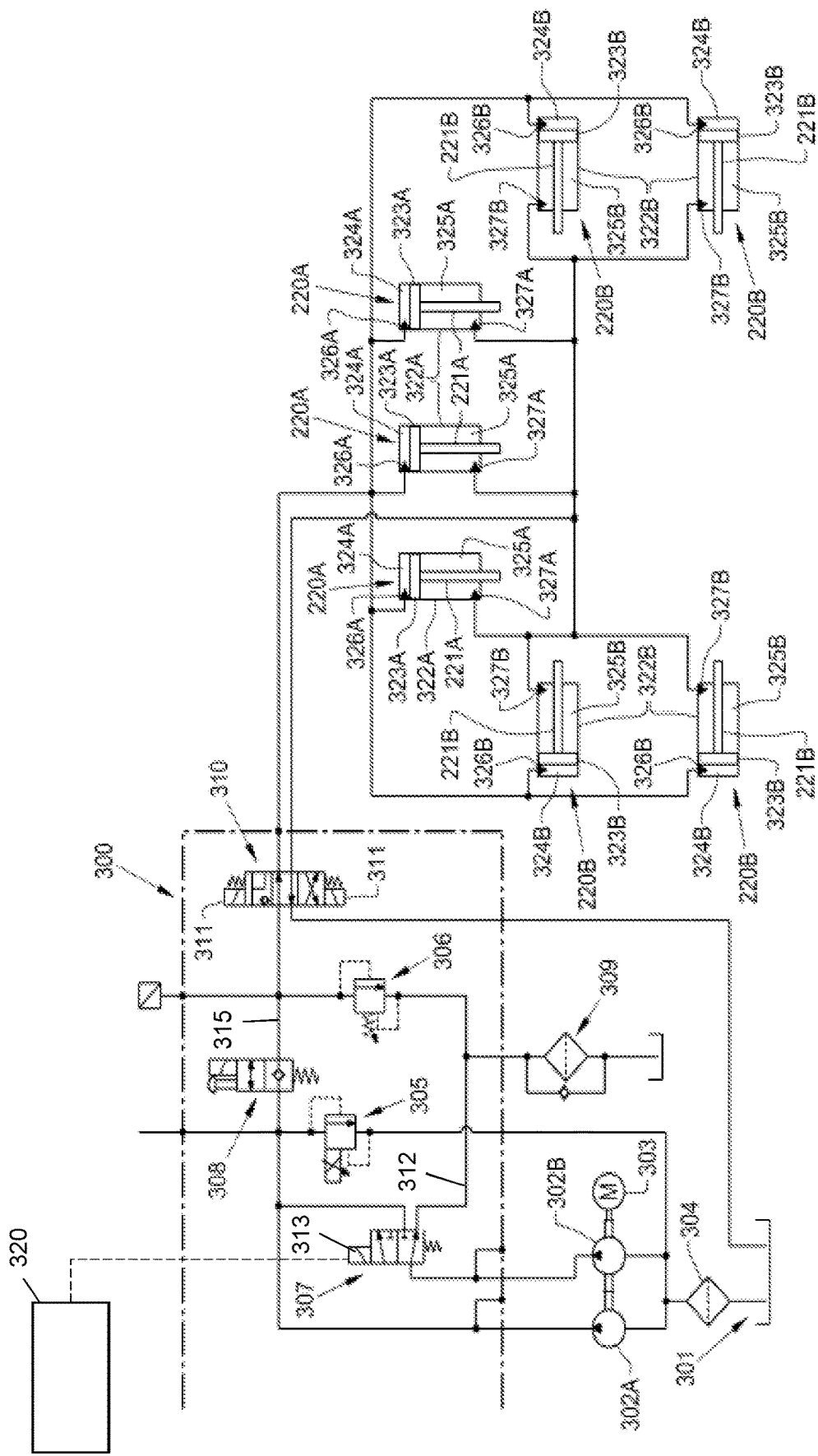
FIG. 3 is a schematic view of a fluid supply circuit that is fluidly coupled to fluid cylinders coupled to density doors of the bale chamber illustrated in FIGS. 1-2.

Referring now to FIG. 3, a schematic view is provided that illustrates a fluid supply circuit 300 fluidly coupled to the fluid cylinders 220A, 220B to supply working fluid to the fluid cylinders 220A, 220B. Each of the fluid cylinders 220A, 220B includes a respective fluid chamber 322A, 322B and a piston 323A, 323B disposed in the fluid chamber 322A, 322B. The pistons 323A, 323B separate the fluid chambers 322A, 322B into respective piston sides 324A, 324B and rod sides 325A, 325B, with the cylinder rods 221A, 221B each coupling to a respective piston 323A, 323B on the rod side 325A, 325B of the fluid chamber 322A, 322B. Each of the fluid cylinders 220A, 220B includes a piston fluid port 326A, 326B that fluidly couples the piston side 324A, 324B of the fluid chamber 322A, 322B with the fluid supply circuit 300. Each of the fluid cylinders 220A, 220B also includes a rod fluid port 327A, 327B that fluidly couples the rod side 325A, 325B of the fluid chamber 322A, 322B with the fluid supply circuit 300.

The fluid supply circuit 300, which may be part of or connected to a main fluid circuit of the baler 10, is configured to supply working fluid to the fluid chambers 322A, 322B of the fluid cylinders 220A, 220B to extend or retract the cylinder rods 221A, 221B and move the density doors 210A, 210B, 210C. The fluid supply circuit 300 may include a fluid reservoir 301, which may be filled with a working fluid such as water or oil. In the example of FIG. 3, two pumps 302A, 302B are fluidly coupled to the fluid reservoir 301. The two pumps 302A and 302B are driven by a common prime mover, e.g. a motor 303, to pressurize and drive fluid through the fluid supply circuit 300. The two pumps, of this example, are uni-directional pumps.

A first pump 302A is permanently connected to a pressurised fluid line 315 of the fluid supply circuit 300. A second pump 302B is selectively connectable to the pressurized fluid line 315 of the fluid supply circuit 300, via a fluid flow control module. In the example of FIG. 3, the fluid flow control module is a directional control valve 307. The directional control valve 307 is provided for selectively supplying additional fluid flow generated by the second pump 302B to the pressurised fluid line 315 by way of switching the directional control valves between its two positions, which will be explained in more detail below. Of course, the fluid flow control module for selectively combining the fluid flow of the two pumps 302A, 302B may also be embodied in any other suitable way.

In some embodiments, a suction screen 304 is disposed between the fluid reservoir 301 and the pumps 302A, 302B. The fluid supply circuit 300 may include a manually adjustable pressure relief valve 306 to lessen the risk of excessive pressure developing in the fluid supply circuit 300. A pressure control module 305 is provided in the fluid supply circuit 300 to determine the pressure in a pressurised fluid line 315 and thus, ultimately, the pressure/force acting on the density doors. In some embodiments, the pressure control module 305 is a proportional relief valve defining a working range of fluid pressures that are supplied to the fluid cylinders 220A, 220B. The working range includes a minimum working fluid pressure, which is the minimum fluid pressure value that the fluid supply circuit 300 is configured to supply to the fluid cylinders 220A, 220B, and a maximum working fluid pressure, which is the maximum fluid pressure value that the fluid supply circuit 300 is configured to supply to the fluid cylinders 220A, 220B.

A load holding valve 308 is arranged to maintain the pressure in the pressurised fluid line 315 if the one or more fluid cylinders 220A, 220B are stationary. The load holding valve 308 may be manually and/or automatically switchable to selectively relief pressurised fluid in the pressurised fluid line 315. The fluid supply circuit 300 may also include one or more filters 309 to capture contaminants that are entrained in the fluid flow. It should be appreciated that the fluid supply circuit 300 may incorporate additional and/or different elements than those previously described, depending on the operating requirements.

The fluid supply circuit 300 also includes a fluid supply controller 310 that is configured to control the supply of fluid from the fluid supply circuit 300 to the fluid cylinders 220A, 220B. The fluid supply controller 310 of the example shown in FIG. 3 is a 4/3-way directional control valve. However, it will be appreciated that the fluid supply controller 310 may also be designed as any other suitable fluid control assembly, such as an arrangement of two 3/2-way valves. The fluid supply controller 310, which may be mechanically or electrically controlled, is selectively switchable to selectively connect the pressurised fluid line 315 of the fluid supply system 300 with either one or both of the piston sides 324A, 324B and the rod sides 325A, 325B of the fluid cylinders 220A, 220B. The fluid supply controller 310 may switch the fluid supply system 300 by, for example, one or more solenoid 311 of the fluid supply controller 310. When the fluid supply controller 310 is in the position shown in FIG. 3, pressurised working fluid is only provided to the piston sides 324A, 324B of the fluid chambers 322A, 322B of the fluid cylinders 220A, 220B through the piston fluid ports 326A, 326B. In some embodiments, the fluid cylinders 220A, 220B are all fluidly coupled to the fluid supply circuit 300 in parallel, so a fluid pressure of working fluid supplied to the fluid chambers 322A, 322B from the fluid supply circuit 300 is generally the same for all of the fluid cylinders 220A, 220B.

Supplying the working fluid only to the piston sides 324A, 324B of the fluid chambers 322A, 322B urges the pistons 323A, 323B toward the respective density doors 210A, 210B, 210C to extend the cylinder rods 221A, 221B and move the density doors 210A, 210B, 210C together, i.e., close the density doors 210A, 210B, 210C. Fluid on the rod sides 325A, 325B of the fluid chambers 322A, 322B, on the other hand, is urged out of the fluid chambers 322A, 322B towards, for example, the fluid reservoir 301. This can be referred to as a first fluid supply mode. As the density doors 210A, 210B, 210C move together, the bale pressing area BP decreases in size, causing the density doors 210A, 210B, 210C to exert a greater pressure on bales in the bale pressing area BP. Simultaneously, the exit space for the bale to move through decreases, which makes it harder for the bale to slide through to the back 32 of the baler. So, applying more pressure on the sides of the formed bale, and simultaneously decreasing the exit space for the bale, will increase the density of the formed bales. In this respect, the first fluid supply mode may be referred to as a "high pressure" mode due to the relatively high pressure that the density doors 210A, 210B, 210C exert on the bales when the fluid supply circuit 300 is in the first fluid supply mode. It should be appreciated that the pressure exerted on the bales in the bale pressing area BP by the density doors 210A, 210B, 210C correlates with the pressure of the working fluid that is supplied to only the piston sides 324A, 324B of the fluid chambers 322A, 322B, i.e. a greater working fluid pressure supplied to only the piston sides 324A, 324B corresponds to a greater pressure exerted on the bales by the density doors 210A, 210B, 210C.

When the fluid supply controller 310 is transferred to a second position (e.g. the valve is pushed down in FIG. 3, pressurised working fluid is supplied to both the piston sides 324A, 324B and the rod sides 325A, 325B of the fluid chambers 322A, 322B. This can be referred to as a second fluid supply mode. The fluid pressure on the piston sides 324A, 324B of the fluid chambers 322A, 322B produces extension forces on the pistons 323A, 323B that urge the coupled cylinder rods 221A, 221B to extend, i.e., close the density doors 210A, 210B, 210C. The fluid pressure on the rod sides 325, 325B of the fluid chambers 322A, 322B, on the other hand, produces retraction forces on the pistons 323A, 323B that urge the coupled cylinder rods 221A, 221B to retract, i.e., open the density doors 210A, 210B, 210C. If the produced extension forces are greater than the retraction forces, the cylinder rods 221A, 221B will still extend to close the density doors 210A, 210B, 210C, but the net force extending the cylinder rods 221A, 221B will be equal to the extension forces minus the retraction forces. If, however, the produced retraction forces are greater than the extension forces, the cylinder rods 221A, 221B will retract to open the density doors 210A, 210B, 210C. In this sense, the fluid cylinders 220A, 220B are dual acting fluid cylinders that can be supplied with working fluid pressure on either side 324A, 324B, 325A, 325B of the pistons 323A, 323B to control extension and retraction of the cylinder rods 221A, 221B.

In the embodiment of FIG. 3, the fluid pressure on the piston side 324A, 324B is the same as the fluid pressure on the rod side 325A, 325B of the fluid chambers 322A, 322B, when the fluid supply controller 310 is in the second position. Even though the fluid pressures on the sides 324A, 324B, 325A, 325B may be equal, the cylinder rods 221A, 221B will still be urged to extend when the fluid supply circuit 300 is in the second fluid supply mode. However, the net extension forces that urge the cylinder rods 221A, 221B to extend and close the density doors 210A, 210B, 210C will be relatively small compared to the extension force produced when the fluid supply controller 310 is in the first position shown in FIG. 3. The net extension forces on the pistons 323A, 323B when the fluid supply controller 310 is in the second fluid supply mode may be, for example, equal to the product of the working fluid pressure supplied to the fluid cylinders 220A, 220B and a surface area of the pistons 323A, 323B covered by the cylinder rods 221A, 221B.

Although in the embodiment described with reference to FIG. 3, the pressure of the hydraulic fluid supplied to the rod sides 325A, 325B and piston sides 324A, 324B of the fluid cylinders 220A, 220B are equal, other embodiments may comprise providing hydraulic fluid of unequal pressure to the opposite sides of the fluid cylinders 220A, 220B.

In some embodiments, the fluid supply controller 310 is switchable to a third position (e.g. the valve is shifted up in FIG. 3). In this third position of the fluid supply controller 310, the fluid supply circuit 300 is configured to supply working fluid to only the rod sides 325A, 325B of the fluid chambers 322A, 322B when the fluid supply circuit 300 is in the third fluid supply mode. Thus, the cylinder rods 221A, 221B are urged to retract, without a significant counteracting extension force, when the fluid supply circuit 300 is in the third fluid supply mode to fully open the density doors 210A, 210B, 210C and create a maximum size of the bale pressing area BP.

Figure 4:
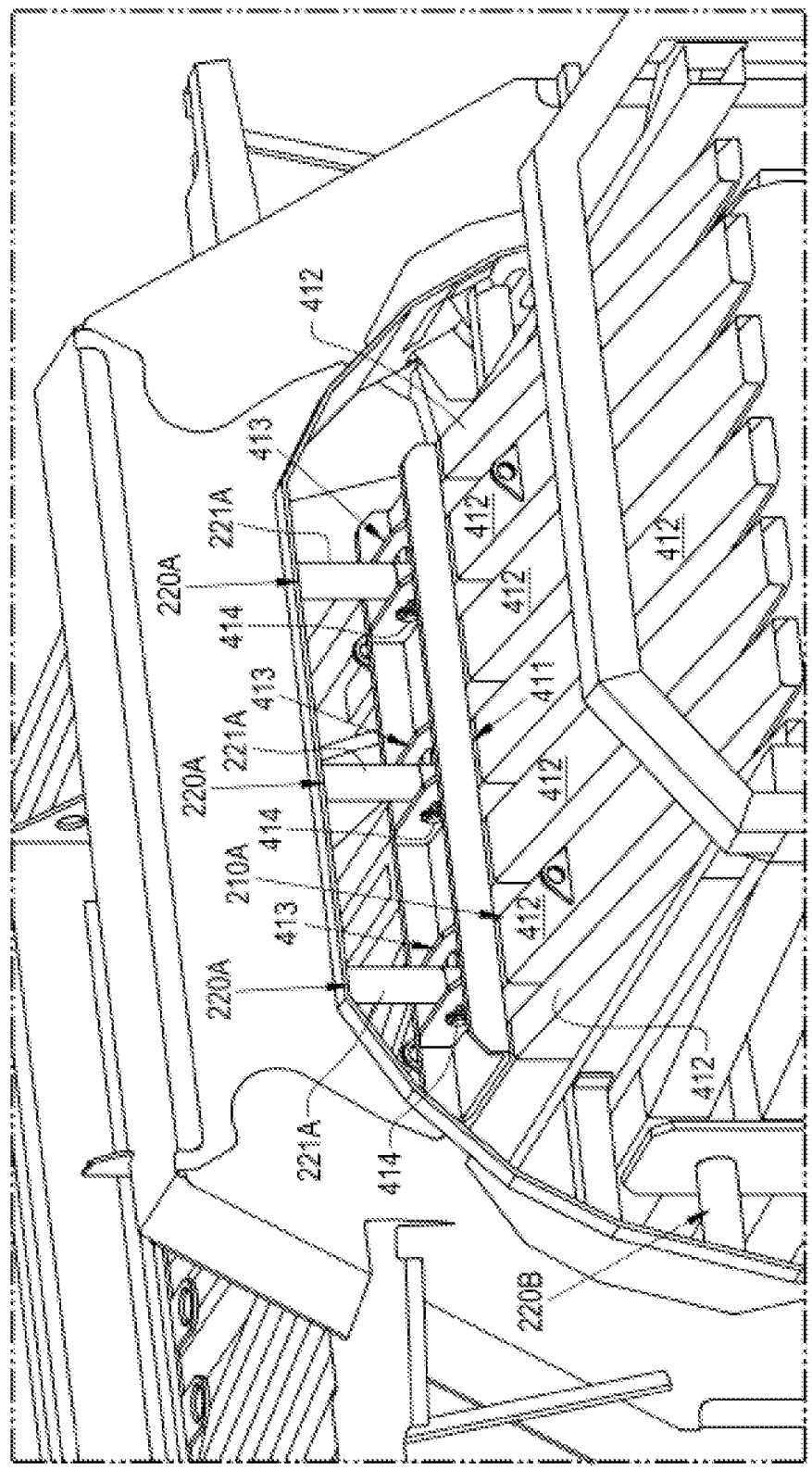
FIG. 4 is a top perspective view of a top density door of the bale chamber illustrated in FIGS. 1-2.

Referring now to FIG. 4, it is illustrated how the fluid cylinders 220A move the top density door 210A. As can be seen, the top density door 210A may include a U-shaped channel 411 that is connected to girders 412 of the top density door 210A. The cylinder rods 221A of the fluid cylinders 220A may each be coupled to a fastening region 413 of the U-shaped channel 411 by fasteners such as, for example, bolts 414. By coupling the cylinder rods 221A of the fluid cylinders 220A to the U-shaped channel 411 via the bolts 414, extension and retraction of the cylinder rods 221A can move the top density door 210A to adjust the size of the bale pressing area BP.

Figure 5:
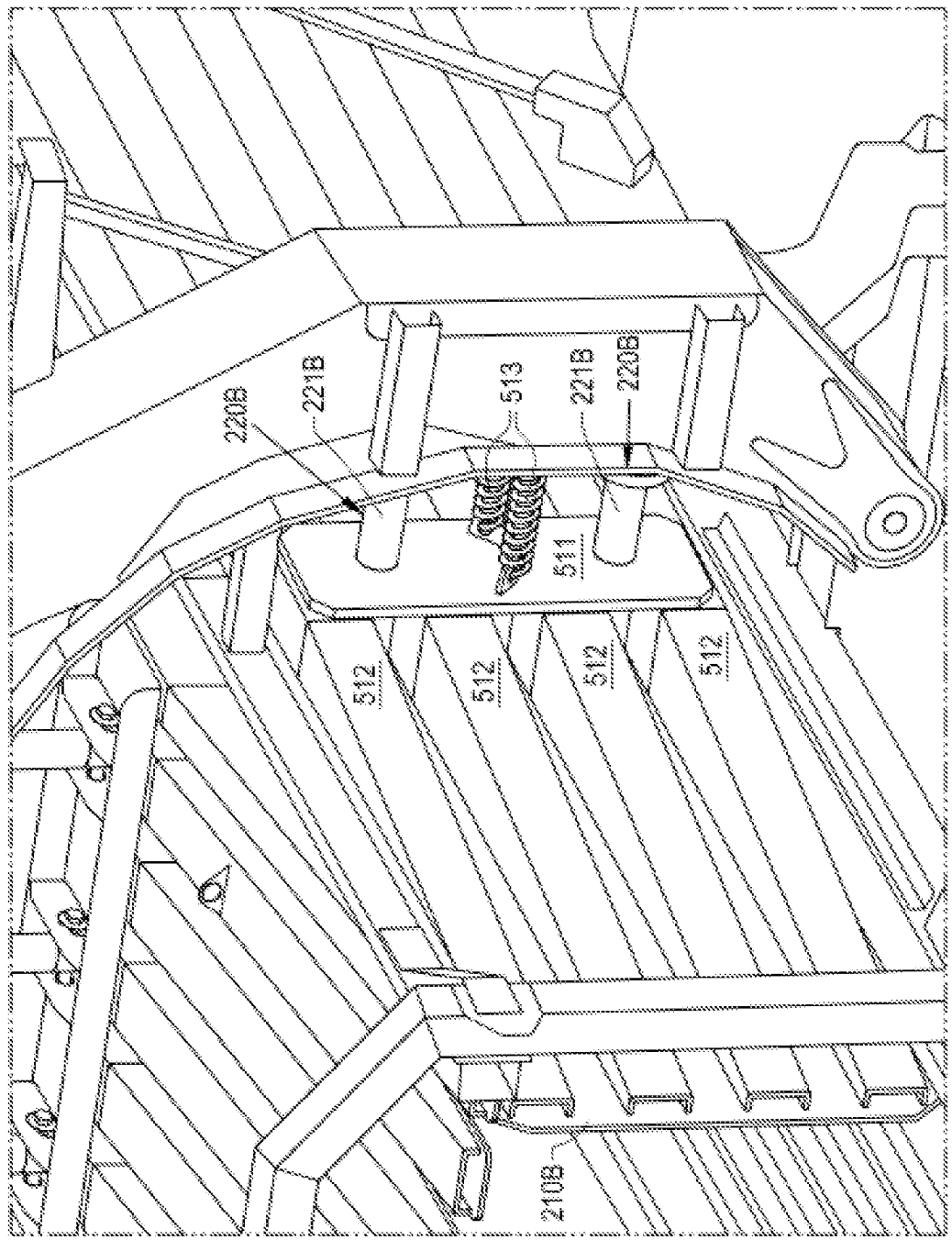
FIG. 5 is a side perspective view of a side density door of the bale chamber illustrated in FIG. 1-2.

Referring now to FIG. 5, it is illustrated how the fluid cylinders 220B move one of the side density doors, such as the side density door 210B. In the illustrated embodiment, a clearance between the side density door 210B and surrounding elements is not great enough to allow attachment of a U-shaped channel for connecting the fluid cylinders 220B to the side density door 210B by a fastener. Instead, the side density door 210B includes a bearing plate 511, which may be attached to girders 512 of the side density door 210B. The cylinder rods 221B of the fluid cylinders 220B bear on the bearing plate 511 so extension of the cylinder rods 221B moves the side density door 210B toward the other side density door 210C to decrease the bale pressing area BP. However, the cylinder rods 221B of the fluid cylinders 220B are not fastened to the bearing plate 511, so retraction of the cylinder rods 221B does not tend to retract the side density door 210B. In order to retract the side density door 210B to open the side density door 210B, one or more springs 513, illustrated as a pair of tension springs, is coupled to the side density door 210B, such as to the bearing plate 511. When the cylinder rods 221B are urged to extend, the cylinder rods 221B overcome retraction forces of the tension springs 513 to extend and push on the bearing plate 511 to move the side density door 210B. When the cylinder rods 221B are urged to retract, the retracted cylinder rods 221B no longer overcome the retraction forces of the tension springs 513 acting on the side density door 210B, allowing the tension springs 513 to move and open the side density door 210B. Thus, the cylinder rods 221B can close the side density door 210B while the tension springs 513 can open the side density door 210B, allowing both closing and opening movements of the side density door 210B in an area with little clearance between elements. It should be appreciated that while the manner of moving side density door 210B by fluid cylinders 220B and tension springs 513 is illustrated in FIG. 5, the other side density door 210C may be moved by fluid cylinders 220B and tension springs 513 in a similar manner.

In other examples, a similar system as used to move the top density door 210A can be used to move the side density doors 210B and 210C. Likewise, a similar system as used to move the side doors 210B and 210C can also be used to move the top density door 210A.

As will be appreciated, the speed at which the actuators (e.g. the fluid cylinders 220A, 220B) move the at least one density door 210a, 210b is dependent on an amount of fluid flow provided by the two pumps 302A, 302B, at least for the embodiment of FIG. 3. It should be noted, however, that the present disclosure is not limited to the use of hydraulic actuators, such as the fluid cylinders 220A, 220B shown in the embodiment of FIG. 3. Rather, the at least one actuator for the density doors of the present disclosure may also be of a pneumatic, magnetic or electric type, in which case the actuation speed may be dependent on other parameters that are well known in the art. Turning back to the embodiment of FIG. 3, the first pump 302A is a fixed displacement pump and so the hydraulic fluid flow provided by the first pump 302A is dependent on the drive speed of the electric motor 303. Similarly, the second pump 302B is a fixed displacement pump and so the hydraulic fluid flow provided by the second pump 302B is also dependent on the drive speed of the electric motor 303. In the embodiment of FIG. 3, the first and second pumps are sized the same and are driven at a common speed by a common drive shaft to provide a substantially identical output flow. If the hydraulic fluid flow provided by the parallel pumps 302A, 302B is combined by means of the directional control valve 307, the amount of fluid flow provided by the fluid supply circuit 300 may be increased to speed up the movement of the at least one actuator, such as the fluid cylinders 220A, 220B. In some examples, the least one actuator is operable in: a first-actuator-speed-mode, in which the at least one actuator moves the at least one density door at a first speed (for instance using hydraulic fluid flow provided by only one of the parallel pumps 302A, 302B); or a second-actuator-speed-mode, in which the at least one actuator moves the at least one density door at a second speed (for instance using hydraulic fluid flow provided by both of the parallel pumps 302A, 302B). The second speed can be greater than the first speed. It will be appreciated that additional actuator-speed-modes can also be used. In this way, changing the mode of operation can adjust the speed at which the at least one actuator moves the at least one density door.

A combination of the hydraulic flows of the two pumps 302A, 302B shall be described in more detail below. It will be appreciated, however, that the movement of the fluid cylinders 220A, 220B (i.e. the actuators) may be sped up in various other ways. In one example, the first pump may be replaced by a variable displacement pump, in which case the supply of hydraulic fluid flow could be increased and decreased by means of the first pump alone. It follows that the second pump may no longer be required. Additional flow for increasing the speed of the actuators may also be provided by other flow sources, such as hydraulic accumulators, etc.

Turning back to the embodiment of FIG. 3, the hydraulic fluid supply circuit 300 is set so that the fluid cylinders 220A, 220B are operable in a first-actuator-speed-mode. In the first-actuator-speed-mode, only the hydraulic fluid flow generated by the first pump 302A is provided to the corresponding fluid cylinders 220A, 220B via the pressurised fluid line 315. In this way, the fluid cylinders 220A, 220B can move the at least one density door 210A, 210B, 210C at a first speed in the first-actuator-speed-mode. In the first-actuator-speed-mode, the directional control valve 307 is in a first position (shown in FIG. 3), in which the hydraulic flow generated by the second pump 302B is recirculated back to tank via a recirculation line 312. In other words, in the first-actuator-speed-mode, the hydraulic fluid flow generated by the second pump 302B is not provided to the fluid cylinders 220A, 220B. The first-actuator-speed-mode can be considered as a "normal actuation mode", which provides sufficient actuator speed for most parts of the operation of the agricultural baler.

The fluid cylinders 220A, 220B shown in FIG. 3 are also operable in a second-actuator-speed-mode (not shown). In the second-actuator-speed-mode, the hydraulic fluid flow generated by the first and the second pump 302A, 302B is combined. In particular, the directional control valve 307 may be switched into a second position (e.g. pushed down in FIG. 3), such that an outlet of the second pump 302B is connected to the pressurised fluid line 315, rather than back to tank via the recirculation line 312. It follows that, in the second-actuator-speed-mode, e.g. when the directional control valve 307 is in its second position, the fluid supply circuit 300 provides an increased hydraulic fluid flow to the density door actuators, e.g. the fluid cylinders 220A, 220B, via the pressurised fluid line 315. The increase in hydraulic fluid flow will cause faster actuation of the fluid cylinders 220A, 220B and thus increased door closing or opening speeds. In this way, the fluid cylinders 220A, 220B can move the at least one density door 210A, 210B, 210C at a second speed in the second-actuator-speed-mode, wherein the second speed is greater than the first speed that is provided in the first-actuator-speed-mode. The second fluid supply mode may thus be considered as a "fast actuation mode".

As mentioned previously, the two pumps 302A, 302B may have a substantially identical output flow. However, due to increased friction in the piping, the combined fluid flow provided by the two pumps 302A, 302B will typically deliver less than twice the flow rate of the single pumps. In some embodiments, combining the flow of the two pumps 302A, 302B may increase the fluid flow by up to 100% compared to the first pump alone. In one embodiment, the second pump 302B has the same size, i.e. provides the same fluid flow rate, as the first pump 302A.

A control unit 320, which is associated with the agricultural baler may be connected to the directional control valve 307 to move the directional control valve 307 between its first and second positions, explained above. To this end, the control unit 320 may be connected to a solenoid actuator 313. In the example shown in FIG. 3, the directional control valve 307 is biased into its first position, such that the fluid cylinders 220A, 220B will operate in the first-actuator-speed-mode (i.e. the "normal actuation mode") by default, i.e. for as long as the solenoid 313 is not energised. By energising the solenoid 313 the control unit 320 may switch the fluid cylinders 220A, 220B from the first-actuator-speed-mode into the second-actuator-speed-mode to selectively increase the actuator speed.

The agricultural baler and the control unit can together be considered as part of an agricultural system. It will be appreciated that the control unit 320 is only schematically represented in the hydraulic scheme of FIG. 3. The control unit 320 is associated with the baler, which does not mean that the control unit 320 is necessarily part of the baler implement shown in FIG. 1. Rather, the control unit may be a part of the agricultural work vehicle (e.g. a tractor) and be connected to the directional control valve 307 of the agricultural baler by electrical wiring or wirelessly. In other embodiments, the control unit 320 may be provided remotely, e.g. at the farm control site, and communicate remotely with the agricultural baler and/or the work vehicle to switch the directional control valve 307 shown in FIG. 3.

Figure 6:
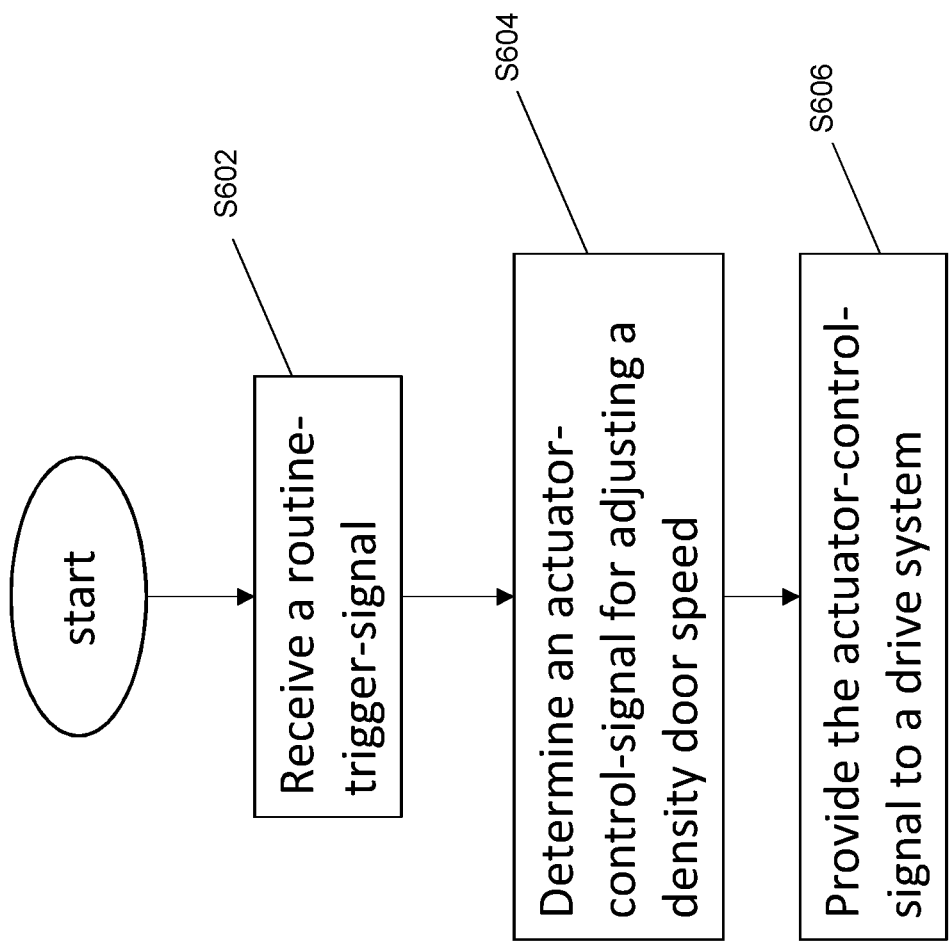
FIG. 6 is a schematic flow chart of a method for controlling an agricultural baler according to the present disclosure.

Turning to FIG. 6, there is shown a method for controlling an agricultural baler. The method shown in FIG. 6 may be a computer-implemented method executed by the control unit 320. The method may be used to determine a required actuator speed at different times during the baler operation. As will be discussed below, the method can adjust the speed at which at least one actuator moves the at least one density door in response to a received routine-trigger-signal. Optionally, the method may also adjust the speed at which at least one actuator moves the at least one density door based on various other input parameters. The control unit 320 may change the actuation speed by providing an actuator-control-signal to a drive system for driving the at least one actuator. In the example of FIG. 3, the control unit 320 may provide the solenoid actuator 313 of the directional control valve 307 of the fluid supply circuit 300 with the actuator-control-signal. However, as mentioned before, the drive system does not necessarily need to be a hydraulic circuit.

In the embodiment of FIG. 6, a first step S602 for receiving a routine-trigger-signal is provided. The routine-trigger-signal may be for initiating a predefined routine, such as a start-up-routine or an end-routine.

In response to the routine-trigger-signal, the method includes a second step S604 for determining an actuator-control-signal for adjusting a speed at which the at least one actuator moves the at least one density door. As will be discussed below, this actuator-control-signal may be applicable to operate the at least one actuator in the second-actuator-speed-mode, which can temporarily increase the speed at which the least one actuator moves the at least one density door.

As a third step S606, the method may include providing the actuator-control-signal to a corresponding drive system. The drive system may be any actuation device or arrangement capable of physically moving the door actuators at various speeds. In the example of FIG. 3, the drive system may be the fluid supply circuit 300 and the control unit 320 may directly provide the actuator-control-signal to the solenoid actuator 313 of the direction control valve 307.

A start of the method shown in FIG. 6 may be triggered by a start-up of the baler. In particular, the step S602 may involve receiving a start-routine-trigger-signal. This can be automatically in response to the engagement of the power take off (PTO), or automatically in response to signals provided by the agricultural work vehicle (e.g. the tractor) when the operator starts the work vehicle's engine, or in response to an operator manually providing input to a user interface to initiate a start-up routine.

Also, the step S602 may involve receiving an end-routine-trigger-signal. This may be automatically in response to a determination that the baler is coming to the end of its operation—e.g. because it determines that a current bale that is being processed will be the last bale in the field (using a predetermined route plan through a field); or in response to an operator manually providing input to a user interface to initiate an end-routine because the operator knows that the current bale will be the last bale in the field.

Applied to the exemplary hydraulic fluid supply circuit shown in FIG. 3, the method of FIG. 6 may be used by the control unit 320 to provide the fluid cylinders 220A, 220B with varying amounts of fluid flow in response to the routine-trigger-signal. In this way, the speed with which the fluid cylinders 220A, 220B can move an associated density door can be adjusted. In one example, the control unit 320 may be configured to switch the fluid cylinders 220A, 220B between the first- and second-actuator-speed-modes.

In relation to a start-up routine, where the routine-trigger-signal is a start-routine-trigger-signal, the control unit may determine an actuator-control-signal for operating the fluid cylinders 220A, 220B in the second-actuator-speed-mode, in which a second amount of fluid flow is provided to the fluid cylinders 220A, 220B by the first pump 302A and the second pump 302B, at a "fast actuation mode". More specifically, in the start-up routine the fluid cylinders 220A, 220B can be operated in the second-actuator-speed-mode to close the at least one density door, in response to the routine-trigger-signal. It can be advantageous to close the at least one density door as quickly as possible in the start-up routine so that the density doors are in a closed position, and the bale chamber is ready to receive crop material as part of a first bale, before crop material is provided to the bale chamber. The first and second pumps 302A, 302B can be driven directly from the primary tractor PTO, and therefore there is no need to wait for the baler to be started up, and for the plunger to start moving, before closing the density doors. In some examples, in the second-actuator-speed-mode, the density doors of the bale chamber may be closed in under 30 seconds. This can be quicker than the time it takes for the baler to start up, and therefore can allow satisfactory baling to be commenced immediately after the baler has started up. It may not be necessary to wait for the baler to start up before the density doors can be closed.

In some examples, the control unit can receive a start-routine-end-signal, after the routine-trigger-signal. The start-routine-end-signal can signify the end of the start-up routine. For instance, the start-routine-end-signal may be automatically generated at the expiry of a predetermined period of time after the routine-trigger-signal. Alternatively, the start-routine-end-signal may be automatically generated when the one or more density doors are in a fully closed position. It will be appreciated that one or more sensors may be included to monitor the position of the density doors.

In response to the start-routine-end-signal, the control unit can determine an actuator-control-signal for operating the fluid cylinders 220A, 220B in the first-actuator-speed-mode. That is, the fluid cylinders 220A, 220B can be operated in their "normal actuation mode" which is at an appropriate speed for adjusting the density doors during a baling operation.

An end-routine, where the routine-trigger-signal is an end-routine-trigger-signal, can relate to a routine that is performed when the baler is coming to the end of a baling operation in a field. For instance after baling the last bale in a field. Or when transferring the last wad, or a predetermined number of wads at the end of the bale, from the pre-compression chamber to the main bale chamber. The end-routine can be for enabling easy removal of a last bale from the baler, when a subsequent bale is not available for ejecting it out of the back of the bale chamber.

The control unit can determine an actuator-control-signal for operating the fluid cylinders 220A, 220B in the second-actuator-speed-mode to move the at least one density door at the "fast actuation speed" in response to the end-routine-trigger-signal. More specifically, in the end-routine the fluid cylinders 220A, 220B can be operated in the second-actuator-speed-mode to open the at least one density door, in response to the end-routine-trigger-signal. It can be advantageous to open the at least one density door at the end of a baling operation to ease the manual removal of the last bale from the bale chamber. Furthermore, it can be advantageous to open the doors as quickly as possible in order to reduce wasted time waiting for the doors to open. This can enable the tractor PTO to be disconnected from the baler without significant delay because the tractor PTO is only required to operate the pumps for a short amount of time, i.e. until the doors are fully opened, after the baling is completed.

In relation to the end-routine, the control-unit can provide an actuator-control-signal for operating the fluid cylinders 220A, 220B in the first-actuator-speed-mode prior to receipt of the end-routine-trigger-signal. That is, the fluid cylinders 220A, 220B can be operated in their "normal actuation mode", which is at an appropriate speed for adjusting the density doors during a baling operation, before the end-routine is commenced.

In the example described above, operating in the first-actuator-speed-mode involves providing fluid to the pressurised fluid line 315 from only one of the two pumps 302A, 302B, and operating in the second-actuator-speed-mode involves providing fluid to the pressurised fluid line 315 from both of the two pumps 302A, 302B. As mentioned, this will result in "normal" or "fast" actuation speeds respectively. However, it should be understood that the present disclosure is not restricted to hydraulic actuators and their corresponding fluid supply circuits. Rather, any other type of actuator may be employed to move the at least one density door at varying speeds. For example, if the density door actuators are electrically actuated, a motor driving the electric actuators may be used to drive the actuator at different speeds. If the motor is an ac motor, an input voltage or frequency may be modulated to vary the speed of the associated electric actuators. It follows that, in this example, the electric actuators may be operated in the first-actuator-speed-mode by providing a first voltage to the motor and in the second-actuator-speed-mode by providing a second voltage to the motor, the second voltage being higher than the first voltage. In some examples, the control-unit may receive bale-chamber-status-data. The control-unit can then adjust the speed at which the fluid cylinders 220A, 220B move the at least one density door based on the bale-chamber-status-data.

If, on the basis of the bale-chamber-status-data, the control unit 320 determines that the bale chamber is substantially empty, the control unit 320 may switch the fluid supply circuit 300 into the second-actuator-speed-mode, in which a second amount of fluid flow, i.e. a combined fluid flow of the first and second pumps 302A, 302B, is provided to the fluid cylinders 220A, 220B. The second-actuator-speed-mode may, thus, be used by the control unit 320 to quickly close the density doors if no crop is determined inside the bale chamber (e.g. during start-up). By using the second-actuator-speed-mode, it may be possible to close an empty bale chamber significantly faster than known balers could.

In one example, the bale-chamber-status-data may indicate that the bale chamber is currently empty (e.g. during start-up), i.e. no crop is present in the bale chamber. In such a scenario, it may be desirable to speed-up actuator movements in order to close the density doors as quickly as possible, before the baling operation can be commenced. Otherwise, if the bale-chamber-status-data indicates that crop is currently present in the bale chamber (e.g. during the baling process), the control unit may operate the actuators at a "normal" speed that is appropriate for slight adjustments of the bale density during the baling process.

According to the present disclosure, the bale-chamber-status-data may include various parameters that provide information about the crop levels within the bale chamber. A non-exhaustive list of examples of bale-chamber-status-data parameters is shown below.

In one embodiment, the bale-status-chamber-data may comprise a load experienced by the plunger during the baling operation. As mentioned above, the one or more crank arms of the plunger may be provided with load cells for determination of a load force experienced by the plunger during the baling process. If crop is present in the bale chamber, the load experienced by the plunger during each stroke is typically significantly higher than a load experienced by the plunger when operating in an empty bale chamber. The load measurements are determined by, for example, load cells and provided to the control unit as live-data continuously or intermittently during the baling process. In one embodiment, the load experienced by the plunger may be provided to the control unit immediately after start-up of the baler, e.g. after engagement of the PTO.

The control unit may be configured to increase the speed at which the at least one actuator is moved if the load experienced by the plunger is below a threshold value, such as 20%, preferably below 10%, of a predetermined set load for a predetermined period of time. For any chosen bale density, a corresponding plunger load may be determined. In particular, the control unit may determine the corresponding, expected plunger load on the basis of the required bale density by means of calculations or look-up tables. If the load determined by the load cells is below the threshold value of the expected plunger load, for a set period of time, the control unit may increase the speed of the actuators, e.g. by switching the fluid supply circuit 300 into its second-actuator-speed-mode.

In one embodiment, the control unit may increase the speed of the at least one actuator (e.g. the fluid cylinders 220A, 220B) if the plunger load is below a threshold value, such as 20% of the expected plunger load for an amount of time it takes for the plunger to complete a predetermined number of strokes. The predetermined number of strokes may be 5 or 10 strokes, for example. If the plunger load is below the threshold value of the expected plunger load for the predetermined number of strokes of the plunger, then the control unit may identify that the bale chamber is empty and thus increase the speed of the actuators to close the bale chamber doors quickly. In view of the above, in some embodiments, the bale-chamber-status-data may also include plunger stroke information associated with a quantity of plunger strokes completed during the above time period. In one example, the plunger stroke information may be derivable from a plunger load data. This is because the plunger load will show a characteristic, repetitive profile for each of the strokes. In particular, the load experienced by the plunger will change significantly between an extension of the plunger into the bale chamber and the following retraction during each stroke, allowing the control unit to count the number of strokes on the basis of the plunger load data. Alternatively, the plunger stroke information may be derived form any other suitable sensor, such as an angle sensor provided on the crank arms of the plunger.

In another embodiment, the bale-chamber-status-data may be indicative of a bale length. The bale length may be determined with any suitable sensor, such as the star-wheel mentioned above. In one embodiment, the control unit may be configured to increase the speed at which the at least one actuator moves the at least one density door if the bale length is less than a threshold-length, such as 10 cm, preferably less than 5 cm, for a predetermined period of time. The set period of time may coincide with the time period for low plunger loads. In other words, if the bale length is less than the threshold-length for a predetermined number of strokes of the plunger or a predetermined period of time, then the control unit may identify that the bale chamber is empty and thus increase the speed of the actuators to close the bale chamber doors quickly.

In yet another embodiment, the bale chamber may be provided with further sensors for determining an empty bale chamber. Some examples include weight sensors determining if a significant amount of crop is present in the bale chamber at any moment during the baling process or optical sensors arranged within the bale chamber. In other words, in some embodiments, the bale-chamber-status-data may comprise weight measurements received from weight sensors connected suitably to the bale chamber and/or image-data representative of a filling level of the bale chamber. In another example, the control unit may be provided with moisture-data as part of the bale-chamber-status-data. The moisture-data may be provided by a moisture sensor associated with the bale chamber. The control unit may compare the values of the moisture-data to a moisture-threshold. On the basis of the comparison result, the control unit may determine whether or not crop is present in the bale chamber. For example, if the values of the moisture-data are above the moisture-threshold for a pre-set number of plunger strokes, the control unit may determine that crop is present in the bale chamber.

While the above examples are described in relation to hydraulic actuators, e.g. hydraulic dual acting cylinders, it will be appreciated that the present disclosure is not limited to hydraulic systems. Rather, any other kind of actuator mechanism may be implemented for as long as the actuation speed is suitably controllable.

If hydraulic fluid supply circuits are used to adjust the actuator speed, it will also be appreciated that connecting a variety of pumps may not be the only way of increasing hydraulic fluid flow to speed up the actuator movements. Rather, hydraulic fluid flow may also be provided with any other suitable means, such as hydraulic accumulators etc. If a variety of pumps are provided, it is not necessary for all of the pumps to be running during the first fluid supply mode. Rather, it may also be possible to only start drive the additional pumps once the fluid supply circuit is switched into its second supply mode.

The listing or discussion of an apparently prior-published document in this specification should not necessarily be taken as an acknowledgement that the document is part of the state of the art or is common general knowledge.

Preferences and options for a given aspect, feature or parameter of the disclosure should, unless the context indicates otherwise, be regarded as having been disclosed in combination with any and all preferences and options for all other aspects, features and parameters of the disclosure.

The invention claimed is:

1. An agricultural system comprising:
an agricultural baler comprising:
a drive system;
a bale chamber partly defined by at least one movable density door; and
at least one actuator comprising a piston that is slideably mounted within a cylinder, the piston being mounted for moving the at least one density door between an open position and a closed position, wherein the at least one actuator is configured to be operated under the control of the drive system, and
a control unit configured to:
receive a routine-trigger-signal;
determine an actuator-control-signal for adjusting a speed at which the at least one actuator moves the at least one density door in response to the routine-trigger-signal; and
provide the actuator-control-signal to the drive system for driving the at least one actuator in either a first-actuator-speed-mode, in which the at least one actuator moves the at least one density door at a first speed, or a second-actuator-speed-mode, in which the at least one actuator moves the at least one density door at a second speed, wherein the second speed is greater than the first speed.

2. The agricultural system of claim 1, wherein:
the routine-trigger-signal is a start-routine-trigger-signal; and
the control unit is further configured to:
provide the drive system with an actuator-control-signal for operating the at least one actuator in the second-actuator-speed-mode to close the at least one density door, in response to the routine-trigger-signal.

3. The agricultural system of claim 2, wherein the control unit is further configured to:
receive a start-routine-end-signal, after the start-routine-trigger-signal; and
provide the drive system with an actuator-control-signal for operating the at least one actuator in the first-actuator-speed-mode in response to the start-routine-end-signal.

4. The agricultural system of claim 1, wherein the control unit is further configured to:
provide the drive system with an actuator-control-signal for operating the at least one actuator in the first-actuator-speed-mode prior to receipt of the routine-trigger-signal.

5. The agricultural system of claim 1, wherein:
the routine-trigger-signal is an end-routine-trigger-signal; and
the control unit is further configured to:
provide the drive system with an actuator-control-signal for operating the at least one actuator in the second-actuator-speed-mode to open the at least one density door, in response to the routine-trigger-signal.

6. The agricultural system of claim 1, wherein the drive system comprises a fluid supply circuit for providing the at least one actuator with varying amounts of fluid flow to adjust the speed at which the at least one actuator moves the at least one density door.

7. The agricultural system of claim 6, wherein the control unit is further configured to switch the fluid supply circuit to select the first-actuator-speed-mode, in which a first amount of fluid flow is provided to the at least one actuator, or the second-actuator-speed-mode, in which a second amount of fluid flow is provided to the at least one actuator, the second amount of fluid flow being higher than the first amount of fluid flow.

8. An agricultural system comprising:
an agricultural baler comprising:
a drive system;
a bale chamber partly defined by at least one movable density door; and
at least one actuator for moving the at least one density door, and
a control unit configured to:
receive a routine-trigger-signal;

determine an actuator-control-signal for adjusting a speed at which the at least one actuator moves the at least one density door in response to the routine-trigger-signal; and provide the actuator-control-signal to the drive system for driving the at least one actuator, wherein the drive system comprises a fluid supply circuit for providing the at least one actuator with varying amounts of fluid flow to adjust the speed at which the at least one actuator moves the at least one density door, wherein the fluid supply circuit comprises at least two fluid flow sources, the fluid flow sources being selectively connectable to the at least one actuator.

9. The agricultural system of claim 8, wherein, when the first-actuator-speed-mode is selected, only one of the at least two fluid flow sources is connected to the at least one actuator, and wherein, when the second-actuator-speed-mode is selected, two or more of the fluid flow sources of the fluid supply circuit are connected to the at least one actuator.

10. The agricultural system of claim 8, wherein the fluid supply circuit comprises a fluid flow control module for selectively connecting one or more of the at least two fluid sources to the at least one actuator, and wherein the control unit is further configured to provide the actuator-control-signal to the at least one fluid flow control module.

11. The agricultural system of claim 10, wherein the at least two fluid flow sources are hydraulic pumps, wherein the hydraulic pumps are preferably driven by a common prime mover.

12. The agricultural system of claim 1, wherein the control unit is further configured to adjust the speed at which the at least one actuator moves the at least one density door on the basis of bale-chamber-status-data indicative of crop levels within the bale chamber.

13. A computer-implemented method for controlling an agricultural baler, the baler comprising a drive system; a bale chamber partly defined by at least one movable density door; and at least one actuator comprising a piston that is slideably mounted within a cylinder, the piston being mounted for moving the at least one density door between an open position and a closed position, the at least one actuator being operated under the control of the drive system, wherein the method comprises:

receiving a routine-trigger-signal;

determining an actuator-control-signal for adjusting a speed at which the at least one actuator moves the at least one density door in response to the routine-trigger-signal; and providing the actuator-control-signal to a drive system for driving the at least one actuator in either a first-actuator-speed-mode, in which the at least one actuator moves the at least one density door at a first speed, or a second-actuator-speed-mode, in which the at least one actuator moves the at least one density door at a second speed, wherein the second speed is greater than the first speed.

14. A computer program configured to perform the method of claim 13.

* * * * *